United States Patent
Lou

(10) Patent No.: US 6,435,213 B2
(45) Date of Patent: *Aug. 20, 2002

(54) SOLENOID OPERATED HYDRAULIC CONTROL VALVE

(75) Inventor: Zheng David Lou, Plymouth, MI (US)

(73) Assignee: Visteon Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/298,444

(22) Filed: Apr. 23, 1999

(51) Int. Cl.[7] .............................................. F15B 13/044
(52) U.S. Cl. .............................. 137/625.65; 251/129.08
(58) Field of Search .................. 137/625.65; 251/129.08

(56) References Cited

U.S. PATENT DOCUMENTS

| | | | | |
|---|---|---|---|---|
| 4,316,599 A | * | 2/1982 | Bouvet et al. ...... | 137/625.65 X |
| 4,491,153 A | * | 1/1985 | Bartholomaus ........ | 137/625.65 |
| 4,535,816 A | * | 8/1985 | Feder et al. ............ | 137/625.65 |
| 4,579,145 A | | 4/1986 | Leiber et al. | |
| 4,635,683 A | * | 1/1987 | Nielsen ................. | 137/625.65 |
| 4,669,504 A | * | 6/1987 | Fujitsugu et al. ...... | 137/625.65 |
| 4,838,313 A | * | 6/1989 | Kobayashi et al. .... | 137/625.65 |
| 4,899,785 A | | 2/1990 | Inokuchi | |
| 4,947,893 A | | 8/1990 | Miller et al. | |
| 5,014,747 A | * | 5/1991 | Suzuki et al. .......... | 137/625.65 |
| 5,174,338 A | * | 12/1992 | Yokota et al. ...... | 137/625.65 X |
| 5,309,944 A | | 5/1994 | Chikamatsu et al. | |
| 5,513,673 A | | 5/1996 | Slavin et al. | |
| 5,615,860 A | | 4/1997 | Brehm et al. | |
| 5,836,335 A | * | 11/1998 | Harms et al. ....... | 137/625.64 X |
| 5,853,028 A | * | 12/1998 | Ness et al. ............. | 137/625.65 |

FOREIGN PATENT DOCUMENTS

| | | | | |
|---|---|---|---|---|
| GB | 2186349 | * | 8/1987 | ............ 137/625.65 |
| JP | 61-244982 | * | 10/1986 | ............ 137/625.65 |
| JP | 2-173487 | * | 7/1990 | ............ 137/625.65 |

* cited by examiner

*Primary Examiner*—Gerald A. Michalsky
(74) *Attorney, Agent, or Firm*—Brinks Hofer Gilson & Lione

(57) ABSTRACT

A pressure control valve with a hydraulic system of an automatic transmission for a motor vehicle includes a valve body defining a control chamber, fluid ports communicating with the control chamber, and a valve spool having spaced pressure control lands located in the control chamber, the valve spool urged by a compression spring in an opposite direction from an electromagnetic force developed on the spool when a solenoid is energized. In one embodiment a control land is formed with a pressure feedback orifice that communicates a control port with a feedback chamber. The valve spool can be formed with different sized control lands. The feedback orifice is substantially insensitive to fluid temperature variation.

4 Claims, 1 Drawing Sheet

SOLENOID OPERATED HYDRAULIC CONTROL VALVE

BACKGROUND OF THE INVENTION

1. Field of the Invention

This invention relates to a pressure control device for controlling the pressure of hydraulic fluid in the control system of an automatic transmission for a motor vehicle. More particularly, the invention pertains to a solenoid-operated pressure control valve.

2. Description of the Prior Art

SAE Technical Paper 960430 describes a hydraulic control valve for use with a solenoid, the valve having two control lands of equal diameter and a long feedback orifice that passes through a control land and a major portion of the spool shank length. That valve is moderately stable due to viscous damping through the feedback orifice. However, it exhibits slow low-temperature response. Furthermore it is difficult and expensive to manufacture, particularly because of the long feedback passage.

U.S. Pat. No. 4,678,893 describe a hydraulic control valve for use with a solenoid, the valve having three control lands of equal diameter and long orifices extending through the valve body. The valve is stable due to the presence of positive hydrodynamic damping; however, it is expensive to manufacture and require a large lateral package space.

U.S. Pat. No. 5,615,860 describes a hydraulic control valve for use with a solenoid, the valve having two control lands. Damping occurs in the electrical solenoid. The valve is simple and compact, but it is unstable because damping is not reliable. Also it is possible that hydraulic fluid may not be continuously available for hydraulic damping.

SUMMARY OF THE INVENTION

It is an object of this invention to provide an improved variable force solenoid-operated valve. The valve is stable and provides inertia damping, either through a short feedback orifice that passes through a land, or through a short damping orifice located at the pressure end. In either case, the valve is easy to manufacture, compact, and stable. It has good response time at low temperature.

The valve provides the ability to operate with these advantages at a low magnitude of load spring force and low electromagnetic force. The output pressure produced by the valve has been demonstrated to be predictable and stable over time and over a large range of line pressure.

In realizing these objects and advantages a solenoid-operated valve assembly for an automatic transmission of a motor vehicle includes a valve body having a control chamber, first, second and third ports spaced mutually along, and communicating with the control chamber; a valve spool located within the control chamber including a shank, a first land adapted to open and close the first port; a feedback orifice connecting a feedback chamber and the second port, and a second land located at an opposite end of the shank and adapted to open and close the third port; a spring urging the valve spool to move along the control chamber; and a solenoid assembly having an armature axially displaceable in response to an electric signal supplied to a coil, the armature urging the valve spool to move along the control chamber.

DETAILED DESCRIPTION OF THE PREFERRED EMBODIMENT

Figure 1:
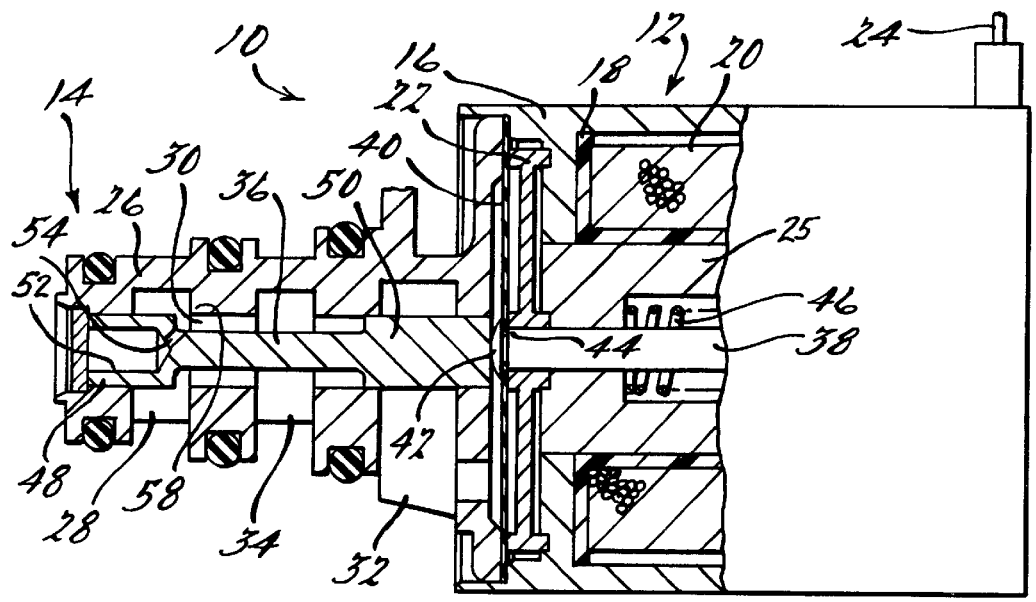
FIG. 1 is a partial cross sectional view through a pressure control valve according to the invention.

Referring first to FIG. 1 a magnetically operated pressure control assembly 10 includes a solenoid portion 12 and a control valve portion 14. The solenoid includes housing 16, in which a magnetic coil member 18 carrying a coil 20 and a magnetic armature 25 are located. Coil 20 has an electrical connection 24 that extends outward from housing 16 and is adapted for connection to a source of electric power.

A valve body 26, attached to housing 16, is provided with an inlet passage or supply port 28, through which hydraulic fluid from a supply source, such as a pressure regulator valve, is carried to a central chamber 30 of the valve; a vent passage or port 32, through which chamber 30 is alternately opened and closed to a low pressure sump or vent; and a control or outlet passage or port 34, through which hydraulic fluid is connected to a hydraulic system or load.

In order to adjust the pressure in control port 34, and the stream of fluid supplied to the load, a valve spool 36 moves axially along the axis of chamber 30 in response to various pressure forces applied to the spool, the force of spring 46, and electromagnetic force applied by a push rod 38 to the spool from magnetic armature 25.

Push rod 38 is press-fitted inside the magnetic armature 25 and is centered radially by a diaphragm spring 40, which is clamped at its periphery on the inner wall of housing 16. The center of diaphragm spring 40 is secured longitudinally between a head 42 of the push rod and a hub 44 of a sealing diaphragm 22. Push rod 38 is supported and guided for sliding movement in a bearing sleeve located at its end that is opposite spool 36. Armature 25 is urged leftward by compression spring 46. Diaphragm spring 40 and sealing diaphragm 22 exert minimum force, if any, in the axial direction.

Spool 36 is formed with a first control land 48 and a second control land 50, each land having a control edge for opening and closing ports 28, 32 respectively, as the spool moves axially within chamber 30. Control land 48 is formed with a central bore 52 that extends partially along the length of the land and communicates with control port 34 through a short feedback orifice 54. The diameter of land 48 can be greater than that of land 50 if a lower spring preload and lower electromagnetic force are desired.

Hydraulic fluid is supplied to the control valve 14 preferably from a source of regulated line pressure through port 28. The fluid pressure produced by valve 14 is communicated through port 34 to a load or hydraulic system, such as a control and actuation system for an automatic transmission. In the alternate embodiment of the invention shown in FIG. 2, the space 55 of chamber 30 located at the left-hand end of control land 48 is connected through an orifice 56 to a source of low pressure such as a transmission fluid sump.

If coil 20 is energized, armature 25 and push rod 38 move rightward toward a pole piece (not shown). The force of compression spring 46 applies to spool 36 a force directed leftward.

Under steady state conditions, spool 36 is balanced primarily by three major forces: the leftward force from compression spring 46 ($F_{spring}$), the rightward electromagnetic force from coil 20 & armature 25 assembly ($F_{em}$), and the rightward net fluid pressure force on the spool. The spring and electromagnetic forces are applied to spool 36 through push rod 38. The fluid pressure force is substantially equal to the product of control pressure (P$_{control}$) times the cross section area of land 50 (A$_{50}$). Therefore, one has the following approximate mathematical relation under steady state condition:

$$P_{control} \approx (F_{spring} - F_{em})/A_{50}$$

Control pressure is thus controlled by electromagnetic force F$_{em}$. Both spring and magnetic forces are generally designed to be substantially constant with respect to the spool movement. If the maximum electromagnetic force is equal to the spring pre-load, then control pressure varies between its maximum and zero when the coil is de-energized and energized, respectively. A full range of inversely-proportional control can be achieved between the two extreme states. It should be noted, as shown in the above force balance equation, that the control pressure is a function of the cross section area of land 50 instead of that of land 48. Without adversely affecting the spring pre-load and the peak magnetic force, one can design a bigger land 48 to accommodate larger flow demand and provide more space for a proper location of orifice 54 on end surface 60.

Whenever the current to coil 20 and thus the electromagnetic force are changed, there will be a momentary force unbalance on spool 36. Spool 36 will be forced to a new position, changing the relative size of the openings at the ports and thus the fluid flows rate from port 28 to port 34 and from port 34 to port 32, thereby producing a new control pressure value to balance spool 36. For example when the coil current is increased, the momentary force increment will pull spool 36 rightward, closing fluid flow from supply port 28 to control port 34 and opening fluid flow from control port 34 to vent port 32. This spool movement reduces control pressure and thus decreases the pressure force that will roughly balance out the electromagnetic force rise.

Feedback damping orifice 54 communicates control pressure to the left end of land 48 through bore 52, thereby offering resistance or damping to spool movement. For example when spool 36 is pulled rightward by an increased electromagnetic force, there will be a momentary pressure imbalance across damping orifice, the pressure at the left-hand end of land 48 being lower than control pressure at the right-hand end because of a vacuum effect caused by the flow restriction through damping orifice 54. This vacuum causes a reduction in net pressure force, which tends to resist the rightward movement of spool 36. The flow through orifice 54 is proportional to the axial displacement velocity of spool 36 if one ignores fluid compressibility and leakage through the annular clearance around the outside diameter of land 48.

Orifice 54 is relatively short, the pressure drop and damping is substantially independent of fluid viscosity and therefore is substantially independent of temperature. In other designs with long orifices, damping is predominantly achieved through laminar fluid flow, which causes too much pressure drop and thus extremely slow response at cold temperatures.

In hydraulic valve design, it is known that at each metering port there is a steady state flow force, or steady state hydrodynamic force, which tends to resist the valve from opening the port. In the case of the metering port between supply port 28 and control port 34, the steady state hydrodynamic force tends to move spool 36 rightward. The source of this force is the well-known Bernoulli effect: the hydrostatic pressure drops when the velocity increases along a fluid stream. Because of continuity, the velocity is the highest and thus the hydrostatic pressure is the lowest at the radially outer edge of surface 60 (see FIG. 2), which is located at the right-hand end of land 48. The hydrostatic pressure on surface 60 is approximately equal to hydrostatic control pressure at the radially inner corner where surface 60 and the spool shank meet. This non-uniform pressure distribution results in a leftward pressure force reduction on surface 60 and thus a net rightward force increase on spool 36. This net force affects the overall force balance on spool 36 and thus control pressure produced by the valve. According to the Bernoulli effect, the hydrostatic pressure distribution along surface 60 and thus valve control pressure are influenced by fluid velocity distribution, which in turn is a function of pressure at supply port 28 and load flow or flow demand. The control pressure from an ideal pressure regulating valve should be a function of input current or electromagnetic force only.

Another advantage of orifice 54 in this application is its potential for line pressure compensation. The exact hydrostatic pressure value in feedback chamber 55 depends on the location of orifice 54 on end surface 60. If the opening is located on surface 60 between its radially outer edge and radially inner corner, the hydrostatic pressure in feedback chamber 55 will be less than the hydrostatic control pressure, thereby reducing the rightward fluid pressure force. A pressure force compensation is achieved if the rightward pressure force reduction in feedback chamber 55 is equal in magnitude to the leftward pressure force reduction on end surface 60.

In addition, the combination of bore 52 and short feedback orifice 54 is easier to manufacture than a combination that includes a long axial passage extending along land 48 to the center of the shank portion of spool 36 and a radial passage communicating with such a long axial passage.

Figure 2:
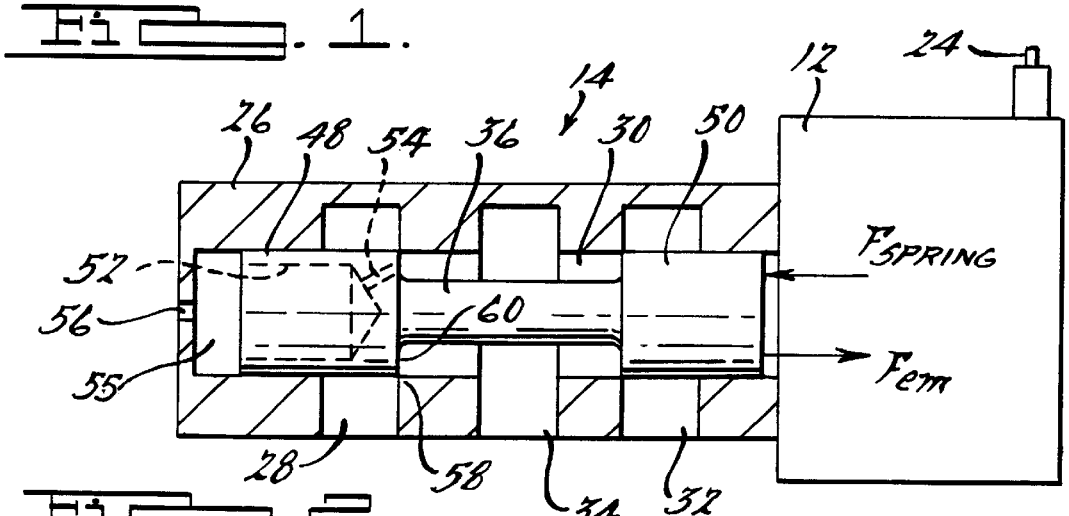
FIG. 2 is a cross section showing a variation of the control valve portion of the assembly of FIG. 1.

In the alternate embodiment of the present invention shown in FIG. 2, one can add a scaling orifice 56 at the left-hand end of feedback chamber 55 to reduce the steady state pressure in chamber 55, thereby allowing the valve to operate with lower magnitudes of spring and electromagnetic forces.

Figure 3:
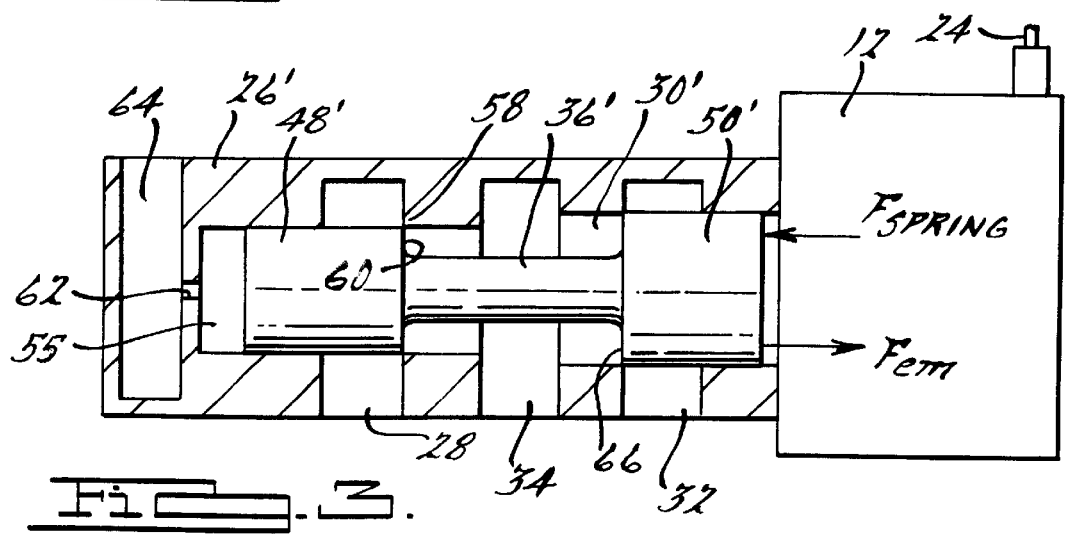
FIG. 3 is a cross section of another embodiment of the control valve portion of the assembly of FIG. 1.

The valve of FIG. 3 creates at the end volume 55 a dynamic pressure to resist movement of the spool. The valve body 26' is formed with a control chamber 30'. A valve spool 36' has a control land 50' having a larger diameter than the diameter of control land 48'. In addition, damping orifice 62 connects the end volume 55 within chamber 30', located at the left-hand end of spool 36 to an oil reservoir 64. Under steady state conditions, the differential pressure force on the faces 60, 66 of the control lands resulting from the pressure in outlet passage 34 is balanced against the net force produced by spring 46 and the electromagnetic force.

If the variable force solenoid is not always immersed in hydraulic fluid, the oil reservoir 64 is necessary to assure that volume 55 is filled with fluid. Orifice 62 is large enough to avoid causing a substantial steady state back pressure in volume 55 due to the leak flow path from supply port 28 and through the clearance between chamber 30' and land 48'. This leak flow tends to fill volume 55.

The presence of the damping orifice 62 at the end of land 48' produces a valve having substantially stable dynamic pressure and improved low temperature performance. The valve is easy to manufacture, yet is simple and compact.

Preferably, the diameter of the orifice 54 is 0.6–1.1 mm. Orifice 54, whose length is preferably no more than 3.0 mm, is relatively short in order to produce turbulent flow, so that the valve is less sensitive to temperature effects, such as the viscosity variation of the transmission fluid, than is laminar flow. Preferably the diameter of lands 48 and 50 is 3.0–6.0 mm. In the case where land 48 is larger than land 50, the diameter of land 48 can be as large as 10.0 mm. The diameter of land 48' is preferably 3.0–10.0 mm, and the diameter of land 50' is preferably 4.0–10.5 mm.

In the valve of FIG. 3, orifice 62 creates a flow restriction, but the restriction preferably will not permit the steady state pressure in volume 55 to be large enough to upset the force balance on the spool. The flow restriction is great enough, however, to resist unstable, oscillatory spool movement. Orifice 62 need not be centered on the axis of the spool. Both the end volume 55 and oil reservoir 64 can be filled with fluid leaking between supply port 28 through the gap between valve body 26' and the outer diameter of control land 48'.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

I claim:

1. A solenoid-operated valve assembly for an automatic transmission of a motor vehicle, comprising:

a valve body having a control chamber, mutually spaced first, second and third ports communicating with the control chamber;

a valve spool supported for movement along the control chamber, including a shank having an outer surface, a first land having a first land axial length and adapted to open and close the first port, the first land having a feedback bore and a feedback orifice connecting the feedback bore and the second port, wherein the feedback bore has an axial bore length that is not greater than the first land axial length and a second land located at an opposite end of the shank from the first land and adapted to open and close the third port, and wherein the feedback orifice is directed radially and axially from the feedback bore to the outer surface of the shank;

a spring urging the valve spool to move along the control chamber; and a solenoid assembly having an armature axially displaceable in response to an electric signal supplied to a coil, the armature urging the valve spool to move along the control chamber.

2. The valve assembly of claim 1 wherein the length of the feedback orifice is relatively short.

3. The valve assembly of claim 1 wherein the first land and second land have substantially equal diameters.

4. The valve assembly of claim 1 wherein the first port is adapted for connection to a source of supply pressure, the third port is adapted for connection to a source of low pressure, and the second port is adapted to produce control pressure achieved by balancing supply flow from the first port, vent flow to the third port, and control flow to and from a load.

* * * * *